(12) United States Patent
Du et al.

(10) Patent No.: US 9,404,034 B2
(45) Date of Patent: Aug. 2, 2016

(54) COATING SYSTEMS AND FLUORESCENT LAMPS PROVIDED THEREWITH

(71) Applicant: GENERAL ELECTRIC COMPANY, Schenectady, NY (US)

(72) Inventors: Fangming Du, Northfield, OH (US); Alok Mani Srivastava, Niskayuna, NY (US); William Winder Beers, Chesterland, OH (US); William Erwin Cohen, Solon, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/138,782

(22) Filed: Dec. 23, 2013

(65) Prior Publication Data

US 2015/0054399 A1 Feb. 26, 2015

Related U.S. Application Data

(60) Provisional application No. 61/868,380, filed on Aug. 21, 2013.

(51) Int. Cl.

| | | |
|---|---|---|
| *C09K 11/02* | (2006.01) | |
| *B32B 9/04* | (2006.01) | |
| *F21V 9/16* | (2006.01) | |
| *H01J 61/44* | (2006.01) | |
| *C09D 5/32* | (2006.01) | |
| *H01J 61/46* | (2006.01) | |

(52) U.S. Cl.
CPC .................. *C09K 11/025* (2013.01); *B32B 9/04* (2013.01); *C09D 5/32* (2013.01); *F21V 9/16* (2013.01); *H01J 61/44* (2013.01); *H01J 61/46* (2013.01)

(58) Field of Classification Search
CPC ........ C09K 11/025; H01J 61/46; H01J 61/44; F21V 9/16
See application file for complete search history.

(56) References Cited

U.S. PATENT DOCUMENTS

| | | |
|---|---|---|
| 2010/0151199 A1 | 6/2010 | Shiao et al. |
| 2011/0215701 A1* | 9/2011 | Tong et al. ............... 313/46 |
| 2011/0216523 A1 | 9/2011 | Tong |
| 2011/0228514 A1 | 9/2011 | Tong |
| 2013/0134863 A1 | 5/2013 | Srivastava |

FOREIGN PATENT DOCUMENTS

| | | |
|---|---|---|
| JP | 2004044040 A | 2/2004 |
| KR | 20090018299 A | 2/2009 |
| WO | 2004009717 A1 | 1/2004 |
| WO | 2005074005 A1 | 8/2005 |
| WO | 2006069376 A1 | 6/2006 |
| WO | 2013159928 A1 | 10/2013 |

OTHER PUBLICATIONS

PCT Search Report and Written Opinion issued in connection with corresponding Application No. PCT/US2014/047407 on Sep. 9, 2014.

* cited by examiner

*Primary Examiner* — Anne Hines
(74) *Attorney, Agent, or Firm* — GE Global Patent Operation; Peter T. DiMauro

(57) ABSTRACT

Coating systems suitable for use in fluorescent lamps, particularly as scattering agents within a UV-reflecting coating for the purpose of improving fluorescent lamp luminosity. Such a coating system is provided on a transparent or translucent substrate and includes a phosphor coating and a scattering agent that scatters UV rays. The scattering agent includes an inorganic powder present in a separate UV-reflecting layer adjacent the phosphor coating and/or dispersed in the phosphor coating so that the scattered UV rays are absorbed by the phosphor coating and cause the phosphor coating to emit visible light. The inorganic powder exhibits low or no absorption to UV rays having wavelengths of 185 nm and 254 nm and is not reactive with mercury.

8 Claims, 1 Drawing Sheet

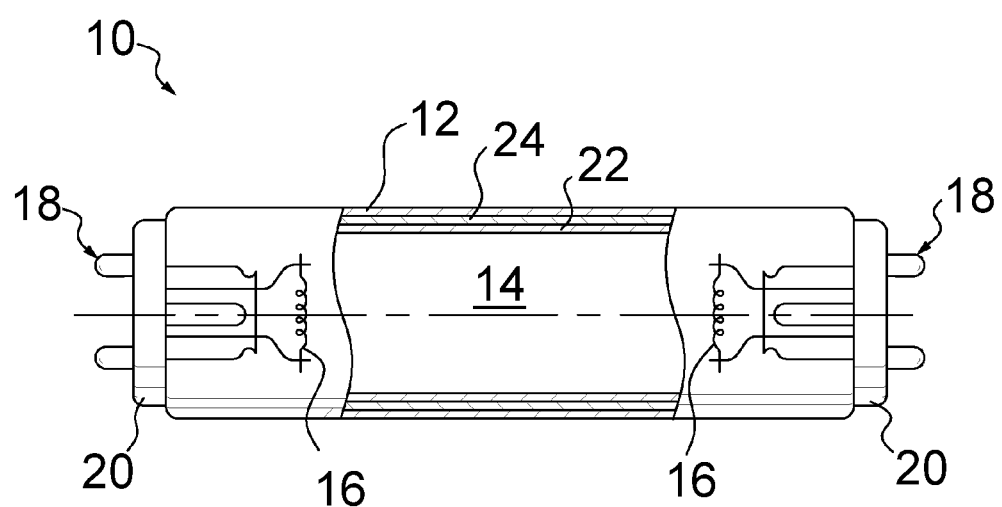

COATING SYSTEMS AND FLUORESCENT LAMPS PROVIDED THEREWITH

CROSS REFERENCE TO RELATED APPLICATIONS

This application claims the benefit of U.S. Provisional Application No. Ser. No. 61/868,380, filed Aug. 21, 2013, the contents of which are incorporated herein by reference.

BACKGROUND OF THE INVENTION

The present invention generally relates to lighting systems and related technologies. More particularly, this invention relates to fluorescent lamps and coating systems utilized by fluorescent lamps to generate visible light.

Fluorescent lamps have been in use and commercialization since the 1930s. More recently, both consumers and producers have voiced increased concerns for energy efficiency and environmental impact of products, spanning all industries, including the lighting industry. As such, fluorescent lights have seen an increase in usage due to their increased energy efficiency when compared to conventional incandescent lights. Fluorescent lights see a great deal of competition from light-emitting diode (LED) lights, due to a potential for greater efficiency and luminosity of LEDs. Significant effort and research have been made in the interest of improving fluorescent light lumen output without increasing power requirements or significantly increasing material costs.

A nonlimiting example of a fluorescent lamp 10 is schematically represented in FIG. 1. The lamp 10 is represented as having a sealed glass tube comprising of a glass envelope or shell 12 enclosing an interior chamber 14. The chamber 14 is preferably at very low pressure, for example, around 0.3% of atmospheric pressure, and contains a gas mixture having at least one constituent that can be ionized to generate radiation that includes ultraviolet (UV) wavelengths. According to the current state of the art, such a gas mixture includes one or more inert gases (for example, argon) or a mixture of one or more inert gases and other gases at a low pressure, along with a small quantity of mercury vapor. Electrodes 16 inside the chamber 14 are electrically connected to electrical contact pins 18 that extend from oppositely-disposed bases 20 of the lamp 10. When the contact pins 18 are connected to a power source, the applied voltage causes current to flow through the electrodes 16 and electrons to migrate from one electrode 16 to the other electrode 16 at the other end of the chamber 14. In the process, this energy converts a small amount of the mercury to a charged (ionized) gaseous (vapor) state. The electrons and charged gas molecules move through the chamber 14, occasionally colliding with and exciting the gaseous mercury molecules, raising the energy level of the electrons in the mercury atoms. In order to return to their original energy level, the electrons release photons.

Due to the arrangement of electrons in mercury atoms, most of the photons released by these electrons are in the ultraviolet (UV) wavelengths. This is not visible light, and as such for the lamp 10 to emit visible light these photons must be converted to a visible light wavelength. Such a conversion can be performed by a coating 22 disposed at the interior surface of the glass shell 12. Such a coating 22 often contains phosphor powders and may be separated from the glass envelope or shell 12 by a UV-reflecting barrier layer 24 of, for example, alumina ($Al_2O_3$) or a halophosphor (such as a calcium halophosphate phosphor). The UV wavelengths emitted by the ionized mercury vapor are absorbed by the phosphor composition within the coating 22, resulting in excitation of the phosphor composition to produce visible light that is emitted through the glass shell 12. More particularly, when electrons of the phosphor atoms are struck by photons, the electrons become excited to a higher energy level and emit a photon to return to their original energy level. The emitted photon has less energy than the impinging photon and is in the visible light spectrum to provide the lighting function of the lamp 10. The color and luminosity of the lamp 10 are largely the result of the phosphor or phosphors used in the coating 22.

A great deal of effort has been made to increase the luminosity of fluorescent lamps without increasing the power requirements, thereby increasing their efficiencies. Currently, the most effective solution to increase luminosity involves the use of rare earth-containing phosphor compositions, including rare earth compounds and transition metal compounds that serve as host materials doped with one or more rare earth activators that, for example, prolong emission time. As nonlimiting examples, phosphor compositions have been employed that contain a controlled mixture of europium-activated barium magnesium aluminate phosphor (BAM, which may be considered as having formula $BaMg_2Al_{16}O_{27}$:$Eu^{2+}$) as a blue-emitting phosphor, cerium- and terbium-co-activated lanthanum phosphate phosphor ($LaPO_4$:$Ce^{3+}$, $Tb^{3+}$; LAP) as a green-emitting phosphor, and europium-activated yttrium oxide phosphor ($Y_2O_3$:$Eu^{3+}$; YEO) as a red-emitting phosphor, mixed in appropriate ratios. As known in the art, the term "activated" refers to the effect that doping with europium, cerium, terbium, and other dopants have with respect to the luminescence of a phosphor.

Rare earth elements are generally considered to include seventeen chemical elements, namely, the fifteen lanthanides, scandium, and yttrium. Despite their name, rare earth elements are fairly abundant. Nevertheless, rare earth elements are becoming increasingly prohibitive to procure and use. Demand for these materials, which are also used in medical technology, wind turbines, hybrid automobiles, TVs, smart phones, and computers, as well as other industries, has significantly increased as these technologies have grown. In addition, rare earth materials may occur as mixtures of various rare earth compounds and in low concentrations. These compounds must be mined, concentrated into oxides, and finally separated into individual rare earth elements or compounds suitable for the intended application. Finally, the majority of the world's rare earth reserves are currently believed to be in limited locations, leading to concerns over pricing and supply stability. As such, the use of rare earth elements has or may become cost-prohibitive, and effective alternative solutions are being sought.

One approach to maximizing the visible light output of a fluorescent lamp is through the utilization of a scattering agent. As noted above, fluorescent lamps have incorporated UV-reflecting barrier layers (24 in FIG. 1) that contain, for example, alumina. Alumina powders have been particularly used as a scattering agent in fluorescent lamps for several decades. While alumina is a very effective scattering agent, it also traps water molecules in the coating. In addition, excessive amounts of alumina powder may negatively impact the effectiveness of the phosphor coating, and may have an adverse effect on the performance of the lamp as a whole. Consequently, while alumina is an effective scattering agent for use in fluorescent lamps, there are limits to its performance-enhancing abilities, and effective alternative solutions have been sought.

BRIEF DESCRIPTION OF THE INVENTION

The present invention provides coating systems suitable for use in fluorescent lamps, and particularly as a scattering agent capable of improving fluorescent lamp luminosity.

According to a first aspect of the invention, a coating system is provided on a transparent or translucent substrate. The coating system includes a phosphor coating and a scattering agent that scatters UV rays. The scattering agent comprises an inorganic powder present in a separate UV-reflecting layer adjacent the phosphor coating and/or dispersed in the phosphor coating so that the scattered UV rays are absorbed by the phosphor coating and cause the phosphor coating to emit visible light. The inorganic powder exhibits low or no absorption to UV rays having wavelengths of 185 nm and 254 nm and is not reactive with mercury.

According to certain preferred aspects of the invention, the inorganic powder may be limited to being present in the separate UV-reflecting layer or dispersed in the phosphor coating. According to additional preferred aspects of the invention, the inorganic powder comprises at least one composition chosen from the group consisting of undoped lanthanide phosphates, undoped yttrium oxide, undoped yttrium phosphate, undoped magnesia, undoped barium magnesium aluminate, undoped lanthanum magnesium borate, undoped lanthanum metaborate, and undoped lanthanum borate.

According to another aspect of the invention, a fluorescent lamp is provided with a glass envelope and a coating system on the glass envelope. The coating system includes a phosphor coating and a scattering agent that scatters UV rays so that the scattered UV rays are absorbed by a phosphor in the phosphor coating and cause the phosphor coating to emit visible light. The scattering agent comprises an inorganic powder that is dispersed in the phosphor coating and/or present in a separate UV-reflecting layer that contacts the phosphor coating. The inorganic powder comprises at least one composition chosen from the group consisting of undoped lanthanide phosphates, undoped yttrium oxide, undoped yttrium phosphate, undoped magnesia, undoped barium magnesium aluminate, undoped lanthanum magnesium borate, undoped lanthanum metaborate, and undoped lanthanum borate.

A technical effect of the invention is that the scattering agent does not absorb 254 nanometer (nm) UV light, but instead scatters UV rays of this wavelength. By applying the inorganic powder to a surface of a fluorescent lamp, the scattered UV rays can be absorbed by a phosphor coating of the lamp. In practice, the inorganic powder has been shown to increase the overall amount of UV rays absorbed by a phosphor coating, resulting in more visible light being produced by the phosphor coating.

Other aspects and advantages of this invention will be better appreciated from the following detailed description.

DETAILED DESCRIPTION OF THE DRAWINGS

FIG. 1 represents a fluorescent lamp, including a fragmentary cross-sectional view of a glass tube of the lamp and an inner surface of the tube provided with a UV-reflecting coating and phosphor-containing coating.

DETAILED DESCRIPTION OF THE INVENTION

The invention will be described hereinafter in reference to the lamp 10 shown in FIG. 1, though it will be appreciated that the teachings of the invention are not limited to the lamp 10 and instead are more generally applicable to various lighting applications in which scattering of UV rays is desired, particularly for the purpose of generating visible light with phosphor compounds.

The invention relates to coating systems that include a phosphor coating, such as the phosphor coating 22 of FIG. 1, applied to a transparent or translucent substrate, such as the glass envelope or shell 12 of the fluorescent lamp 10. In the nonlimiting example of FIG. 1, a discrete UV-reflecting layer 24 is represented as a constituent of a coating system that includes the phosphor coating 22. The UV-reflecting layer 24 contains a scattering agent in the form of an inorganic powder, and the layer 24 is formed by applying the inorganic powder to the glass shell 12 adjacent the phosphor coating 22, for example, between the phosphor coating 22 and the glass shell 12. The scattering agent of the layer 24 is selected on the basis of its ability to scatter incoming UV rays emitted from an ionized constituent (for example, mercury) within the chamber 14 of the lamp 10. The scattered UV rays are then absorbed by the adjacent phosphor coating 22, which as a result emits visible light.

Suitable phosphor compositions for the phosphor coating 22 include but are not limited to the aforementioned red, green and blue-emitting phosphors, namely, rare earth-activated BAM, LAP, and YEO. According to preferred aspects of the invention, suitable compositions for the scattering agent exhibit low or no absorption to UV rays having wavelengths of 185 nm and 254 nm, and are not reactive with mercury. As used herein, "not reactive with mercury" means and encompasses both chemical and physical interactions that would deplete the low-pressure fill within the lamp chamber 14 of mercury vapor, for example, to the extent that the overall lumen output of the lamp 10 would be lower than would occur in the absence of the scattering agent. Chemical interactions include reactions that would lead to the formation of a compound with mercury, whereas physical interactions include absorption or adsorption of mercury. The scattering agent may comprise or consist of an inorganic powder, particularly notable but nonlimiting examples of which include undoped lanthanide phosphates ($LnPO_4$, wherein Ln refers to the lanthanide rare earth metals (Group IIIB of the Periodic Table)), undoped yttrium oxide ($Y_2O_3$), undoped yttrium phosphate ($YPO_4$), undoped magnesia (MgO), undoped barium magnesium aluminate ($BaMgAl_{10}O_{17}$), undoped lanthanum magnesium borate ($LaMgB_5O_{10}$), undoped lanthanum metaborate ($LaB_3O_6$), undoped lanthanum borate ($LaBO_3$), and/or another composition capable of achieving the same or a similar effect as undoped lanthanum phosphate or yttrium oxide through the same or a similar scattering mechanism. As used herein, "undoped" refers to the absence of an activator capable of prolonging emission time of a phosphor composition. Lanthanum phosphate and yttrium oxide as the inorganic powder composition have been demonstrated to be functionally effective over a wide range of particle sizes and concentrations. In general, it is believed that particle size can be optimized on a case-by-case basis. Though the phosphor coating 22 and UV-reflecting layer 24 are represented as discrete layers, it is within the scope of the present invention that the discrete layer 24 could be eliminated and its inorganic powder incorporated into the phosphor coating 22, as will be discussed below.

As discussed previously in reference to FIG. 1, by scattering the UV rays emitted by ionized mercury, the UV-reflecting layer 24 promotes the absorption of the UV rays by the phosphor coating 22. This results in an increased visible light emission from the phosphor coating 22, thereby increasing the overall lumen output of the fluorescent lamp 10 without increasing power requirements. Therefore, the lumen output of the lamp 10 can be increased without increasing the power requirements of the lamp 10.

Addressing issues discussed above, the aforementioned inorganic powder compositions do not tend to absorb or retain moisture as does alumina, and therefore do not negatively impact the performance of the lamp 10 in the manner that an alumina-containing UV-reflecting layer 24 would. Advantageously, preferred inorganic powder compositions such as lanthanum phosphate and yttrium oxide are more readily available than some other rare earth phosphors. In particular, lanthanum phosphate and yttrium oxide are both more easily acquired, with currently little or no supply concerns, and are also much more commonly found in commercial use for various applications. As such, lanthanum phosphate and yttrium oxide can be acquired at a lower cost as compared to rare earth phosphor materials, and incorporating lanthanum phosphate and/or yttrium oxide into the UV-reflecting layer 24 of FIG. 1 has the capability of increasing the lumen output of the fluorescent lamp 10 while avoiding or offsetting the need to add additional and more expensive rare earth phosphors to the phosphor coating 22 in order to achieve an equivalent increase in lumen output.

The UV-reflecting layer 24 containing particles of one or more of the aforementioned inorganic powder compositions can be formed by various known procedures, including but not limited to deposition from liquid coatings and electrostatic deposition. As such, the manner of coating deposition is not a limiting factor of the invention. As particular but non-limiting examples, a UV-reflecting layer containing particles of the inorganic powder composition(s) can be deposited on the inner surface of the glass shell 12 from an otherwise conventional aqueous coating solution that contains various organic binders, adhesion-promoting agents, and nonluminescent additives including thickeners, dispersing agents, and surfactants.

Though providing the inorganic powder in a separate layer 24 adjacent to the phosphor layer 22 has been shown to result in an increase in lumen output (e.g., lumens per watt, or LPW), dispersing the inorganic powder in the phosphor layer 22 surprisingly provides its own distinct advantages, even though the inorganic powder effectively dilutes the phosphor material within the phosphor layer 22 with a non-phosphor, UV-scattering media. In particular, investigations leading to the present invention have shown that the phosphor layer 22 can be diluted to a significant extent, for example, up to at least 50 weight percent, without significantly decreasing the lumen output of the phosphor layer 22, for example, less than a 5 percent reduction in LPW as compared to an otherwise identical phosphor layer 22 that excludes the inorganic powder. As particular examples, otherwise identical phosphor layers modified to contain, by weight, about 5%, about 10%, about 20%, and about 50% of a lanthanum phosphate powder (particle size (d50) of 3.6 micrometers) have been shown to exhibit a decrease in LPW of, respectively, 99.1%, 98.8%, 98.7% and 96.7% relative to an otherwise identical phosphor layer that did not contain any lanthanum phosphate powder, evidencing that a 1:1 proportional relationship surprisingly did not exist between inorganic powder content and LPW. This aspect of the invention offers the potential for reducing the cost of producing a fluorescent lamp, as it reduces the phosphor content of the phosphor layer 22, and also has the potential for facilitating mixing and processing of the phosphor layer 22.

While the invention has been described in terms of preferred embodiments, it is apparent that other forms could be adopted by one skilled in the art. For example, the lamp 10 could differ in appearance and construction from the embodiment shown in FIG. 1, and appropriate materials could be substituted for those noted. Accordingly, it should be understood that the invention is not limited to the specific embodiment illustrated in FIG. 1. It should also be understood that the phraseology and terminology employed above are for the purpose of disclosing the illustrated embodiment, and do not necessarily serve as limitations to the scope of the invention. Therefore, the scope of the invention is to be limited only by the following claims.

The invention claimed is:

1. A coating system on a transparent or translucent substrate, the coating system comprising:
 a phosphor coating; and
 a scattering agent that scatters UV rays, the scattering agent comprising an inorganic powder which is: present in a separate UV-reflecting layer adjacent the phosphor coating between the phosphor coating and the substrate, so that the scattering agent scatters UV rays to the phosphor coating and the scattered UV rays are absorbed by the phosphor coating and cause the phosphor coating to emit visible light, wherein the inorganic powder comprised in the scattering agent exhibits low or no absorption to UV rays having wavelengths of 185 nm and 254 nm and is not reactive with mercury.

2. The coating system according to claim 1, wherein the inorganic powder comprises at least one chosen from the group consisting of undoped lanthanide phosphates, undoped yttrium phosphate, undoped magnesia, undoped barium magnesium aluminate, undoped lanthanum magnesium borate, undoped lanthanum metaborate, and undoped lanthanum borate.

3. The coating system according to claim 1, wherein the inorganic powder comprises lanthanum phosphate.

4. The coating system according to claim 1, wherein the inorganic powder consists of lanthanum phosphate.

5. The coating system according to claim 1, wherein the inorganic powder is dispersed in the phosphor coating.

6. The coating system according to claim 1, wherein the transparent or translucent substrate is a glass envelope of a fluorescent lamp.

7. The coating system according to claim 1, wherein the inorganic powder increases a lumen output of the phosphor coating.

8. A coating system on a transparent or translucent substrate, the coating system comprising:
 a phosphor coating; and
 a scattering agent that scatters UV rays, the scattering agent comprising an inorganic powder which is: (a) present in a separate UV-reflecting layer adjacent the phosphor coating between the phosphor coating and the substrate, and/or (b) dispersed in the phosphor coating so that the scattering agent scatters UV rays to the phosphor coating and the scattered UV rays are absorbed by the phosphor coating and cause the phosphor coating to emit visible light, wherein the inorganic powder comprised in the scattering agent exhibits low or no absorption to UV rays having wavelengths of 185 nm and 254 nm and is not reactive with mercury, and
 wherein the inorganic powder comprises at least one chosen from the group consisting of undoped lanthanide phosphates, undoped yttrium phosphate, undoped magnesia, undoped barium magnesium aluminate, undoped lanthanum magnesium borate, undoped lanthanum metaborate, and undoped lanthanum borate.

* * * * *